(12) United States Patent
Velasco (10) Patent No.: US 9,384,193 B2
(45) Date of Patent: Jul. 5, 2016

(54) USE AND ENFORCEMENT OF PROVENANCE AND LINEAGE CONSTRAINTS

(75) Inventor: Marc B. Velasco, Orange, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/183,850

(22) Filed: Jul. 15, 2011

(65) Prior Publication Data

US 2013/0018858 A1    Jan. 17, 2013

(51) Int. Cl.
*G06F 7/00* (2006.01)
*G06F 17/30* (2006.01)

(52) U.S. Cl.
CPC .... *G06F 17/30011* (2013.01); *G06F 17/30017* (2013.01)

(58) Field of Classification Search
None
See application file for complete search history.

(56) References Cited

U.S. PATENT DOCUMENTS

| | | | |
|---|---|---|---|
| 5,806,078 A | | 9/1998 | Hug et al. |
| 5,890,164 A | | 3/1999 | Nielsen |
| 5,999,947 A | | 12/1999 | Zollinger et al. |
| 6,108,670 A | * | 8/2000 | Weida et al. |
| 6,681,369 B2 | | 1/2004 | Meunier et al. |
| 7,051,009 B2 | | 5/2006 | Suermondt et al. |
| 7,610,545 B2 | | 10/2009 | Wagner et al. |
| 7,693,864 B1 | | 4/2010 | Pasupathy et al. |
| 7,721,259 B2 | | 5/2010 | Heinke et al. |

(Continued)

FOREIGN PATENT DOCUMENTS

| | | |
|---|---|---|
| CN | 1794207 A | 6/2006 |
| WO | 2006026636 A2 | 3/2006 |
| WO | 2011150027 | 1/2011 |

OTHER PUBLICATIONS

Friedrich II, John R, "Meta-data Version and Configuration Management in Multi-Vendor Environments", Proceedings of the ACM SIGMOD International Conference on Management of Data, p. 799-804, 2005, SIGMOD 2005: Proceedings of the ACM SIGMOD International Conference on Management of Data, ACMs.

(Continued)

*Primary Examiner* — Debbie Le
*Assistant Examiner* — Hasanul Mobin
(74) *Attorney, Agent, or Firm* — Farrokh Pourmirzaie; Edell, Shapiro & Finnan, LLC (57) ABSTRACT

Provided are techniques for managing constraints. Content data and content metadata that is associated with the content data is stored. In response to receiving a change to one of the content data and the content metadata, a provenance value is calculated based on the change, wherein the provenance value represents a change in content between the changed content data or the content metadata and an original version of the content data or the content metadata, and a lineage value is calculated based on the change, wherein the lineage value represents a change in authorship between the changed content data or the content metadata and the original version of the content data or the content metadata. It is determined whether the calculated provenance value violates at least one constraint. It is determined whether the calculated lineage value violates at least one constraint. In response to determining that the calculated provenance value or the calculated lineage value violates at least one constraint, one or more actions associated with the violated constraint are performed, wherein the one or more actions include allowing the change and preventing the change.

17 Claims, 5 Drawing Sheets

(56) References Cited

U.S. PATENT DOCUMENTS

| | | | |
|---|---|---|---|
| 7,987,172 B1 | 7/2011 | Carver | |
| 8,250,037 B2 | 8/2012 | Andersen et al. | |
| 8,284,198 B1 | 10/2012 | Hackworth et al. | |
| 8,538,989 B1 | 9/2013 | Datar | |
| 8,555,157 B1 | 10/2013 | Fu | |
| 9,015,118 B2 | 4/2015 | Velasco | |
| 2002/0023097 A1* | 2/2002 | Ripley | 707/200 |
| 2002/0073138 A1* | 6/2002 | Gilbert | G06F 17/30 709/201 |
| 2002/0123988 A1* | 9/2002 | Dean | G06F 17/30864 |
| 2004/0019846 A1* | 1/2004 | Castellani et al. | 715/500 |
| 2005/0060281 A1* | 3/2005 | Bucher | G06F 17/30011 |
| 2005/0071741 A1 | 3/2005 | Acharya | |
| 2005/0154761 A1 | 7/2005 | Lee et al. | |
| 2005/0165865 A1* | 7/2005 | Farmer | G06F 17/30592 |
| 2006/0004886 A1 | 1/2006 | Green et al. | |
| 2006/0080369 A1* | 4/2006 | Razdow et al. | 707/204 |
| 2006/0085738 A1* | 4/2006 | Chapus | G06F 17/2211 715/255 |
| 2006/0143243 A1 | 6/2006 | Polo-Malouvier et al. | |
| 2006/0288081 A1 | 12/2006 | Sung et al. | |
| 2007/0088957 A1* | 4/2007 | Carson | G06F 21/64 713/176 |
| 2007/0118572 A1 | 5/2007 | Fischer et al. | |
| 2007/0294246 A1 | 12/2007 | Evans et al. | |
| 2008/0021922 A1 | 1/2008 | Hailpern et al. | |
| 2008/0040388 A1* | 2/2008 | Petri | G06F 17/30144 |
| 2008/0126399 A1 | 5/2008 | MacGregor | |
| 2008/0134025 A1 | 6/2008 | Harada | |
| 2008/0177755 A1* | 7/2008 | Stern | G06F 21/568 |
| 2008/0178302 A1 | 7/2008 | Brock et al. | |
| 2008/0195509 A1* | 8/2008 | Bellacicco et al. | 705/28 |
| 2008/0201381 A1 | 8/2008 | Desai et al. | |
| 2008/0270462 A1* | 10/2008 | Thomsen | G06F 17/30545 |
| 2009/0024608 A1 | 1/2009 | Deolalikar | |
| 2009/0063535 A1 | 3/2009 | Petri | |
| 2009/0125382 A1 | 5/2009 | Delepet | |
| 2009/0182780 A1* | 7/2009 | Wong et al. | 707/200 |
| 2009/0199090 A1 | 8/2009 | Poston et al. | |
| 2009/0204595 A1 | 8/2009 | Dombrowski | |
| 2009/0234833 A1 | 9/2009 | Davis, II et al. | |
| 2009/0307137 A1* | 12/2009 | White | G06F 21/6245 705/51 |
| 2009/0319910 A1* | 12/2009 | Escapa | G06F 17/241 715/751 |
| 2010/0107244 A1 | 4/2010 | Li et al. | |
| 2010/0114628 A1 | 5/2010 | Adler et al. | |
| 2010/0251374 A1 | 9/2010 | Dill et al. | |
| 2010/0287204 A1 | 11/2010 | Amini et al. | |
| 2010/0299339 A1 | 11/2010 | Kementsietsidis et al. | |
| 2011/0047056 A1 | 2/2011 | Overman et al. | |
| 2011/0296507 A1 | 12/2011 | Khosrowshahi | |
| 2011/0313848 A1* | 12/2011 | Vaidyanathan | G06Q 30/02 705/14.43 |
| 2012/0254048 A1 | 10/2012 | Roberts et al. | |
| 2012/0254128 A1 | 10/2012 | Bath et al. | |
| 2013/0018848 A1 | 1/2013 | Velasco | |
| 2013/0018858 A1 | 1/2013 | Velasco | |
| 2013/0018873 A1 | 1/2013 | Velasco | |
| 2013/0198145 A1 | 8/2013 | Avery et al. | |
| 2014/0025645 A1 | 1/2014 | Brown et al. | |
| 2014/0032513 A1 | 1/2014 | Gaither | |
| 2014/0280204 A1 | 9/2014 | Avery et al. | |
| 2014/0379657 A1 | 12/2014 | Avery | |

OTHER PUBLICATIONS

FortiDB Version 3.2 Metadata Monitor User Guide, www.fortinet.com, Dec. 19, 2008.

M. Gao, "Recording How-Provenance on Probabilistic Databases", 2010 12th International Asia-Pacific Web Conference, Shanghai, China, pp. 205-211.

P. Groth, "A Distributed Algorithm for Determining the Provenance of Data", Fourth IEEE International Conference on eScience, 2008, pp. 166-173.

IBM, ip.com PriorArtDatabase, "System and Methods to Enable Trusted Provenance Tracking and Rights/Responsibilities Evaluation in Collaborative Developing Environment", Oct. 17, 2006 (8 pages).

Y. Simmhan, "A Framework for Collecting Provenance in Data-Centric Scientific Workflows", IEEE International Conference on Web Services, 2006, Bloomington, IN, (8 pages).

International Search Report and Written Opinion in International Application No. PCT/IB2012/052734, mailed Oct. 18, 2012.

International Search Report and Written Opinion, PCT/EP2013/050160, May 6, 2013, 8 pages.

* cited by examiner

FIG. 5

USE AND ENFORCEMENT OF PROVENANCE AND LINEAGE CONSTRAINTS

CROSS-REFERENCE TO RELATED APPLICATIONS

This application is a non-provisional application that is related to (1) application Ser. No. 13/183,840, filed on the same date herewith, and entitled "Versioning of Metadata, Including Presentation of Provenance and Lineage for Versioned Metadata"; and (2) application Ser. No. 13/183,847, filed on the same date herewith, and entitled "Determining and Presenting Provenance and Lineage for Content in a Content Management System"; the entire contents of each of which is hereby incorporated herein by reference.

BACKGROUND

Embodiments of the invention relate to use and enforcement of provenance and lineage constraints in, for example, a content management system.

Provenance and lineage information may be stored and updated in a computing system. Provenance information may be described as an indication of how much one version of content differs from another version of that content (e.g., how much one version of a document differs from the original version of the document). Lineage information may be described as an indication of authorship. For example, an initial version of a document may be created by a first author and updated by a second author.

SUMMARY

Provided are a method, computer program product, and system for managing constraints. Content data and content metadata that is associated with the content data is stored. In response to receiving a change to one of the content data and the content metadata, a provenance value is calculated based on the change, wherein the provenance value represents a change in content between the changed content data or the content metadata and an original version of the content data or the content metadata, and a lineage value is calculated based on the change, wherein the lineage value represents a change in authorship between the changed content data or the content metadata and the original version of the content data or the content metadata. It is determined whether the calculated provenance value violates at least one constraint. It is determined whether the calculated lineage value violates at least one constraint. In response to determining that the calculated provenance value or the calculated lineage value violates at least one constraint, one or more actions associated with the violated constraint are performed, wherein the one or more actions include allowing the change and preventing the change.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
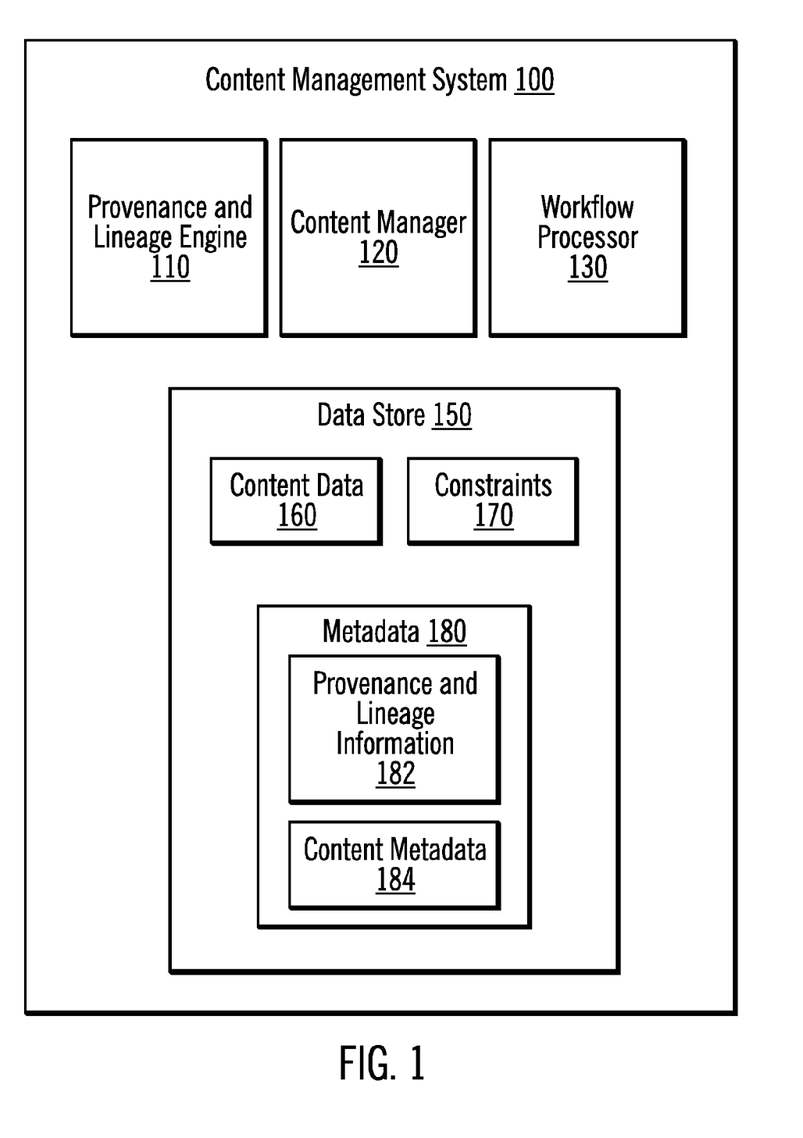
FIG. 1 illustrates, in a block diagram, a computing architecture in accordance with certain embodiments.

FIG. 1 illustrates, in a block diagram, a computing architecture in accordance with certain embodiments. A content management system 100 includes a provenance and lineage engine 110, a content manager 120, and, optionally, a workflow processor 130. The content management system 100 is coupled to a data store 150. The data store 150 includes data, 160, constraints 170, and metadata 180. The metadata 180 includes provenance and lineage information 182 and other content metadata 184. The provenance and lineage information 182 may be associated with the content data 160, the content metadata 184 or both.

The content manager 120 manages the content data 160 (e.g., documents, images, videos, etc.). For example, the content manager 120 tracks multiple versions of content data (e.g., multiple versions of a document). The content manager 120 associates metadata 180 with the content data 160. The content manager 120 allows new content data 160 and new content metadata 184 to be added. The content manager 120 allows existing content data 160 and existing content metadata 184 to be changed (e.g., deleted or updated). In particular, the content manager 120 allows the content data 160 to be checked-out, changed, and checked-in.

The provenance and lineage engine 110 automatically takes actions based on the content data 160 or content metadata 184 that may be continuously ingested into the content management system 100. The actions may include performing actions (e.g., sending a notification) or preventing actions (e.g., preventing an update to the content data 160 or the content metadata 184). In the case of provenance and lineage information 182, as the content data 160 and content metadata 184 are changed, the provenance and lineage engine 110 tracks (i.e., updates) the provenance and lineage information 182 for the data 160, 184.

The provenance and lineage engine 110 provides the ability to report and/or display the provenance and lineage information 182 using the content manager 120.

As the provenance and lineage information 182 is collected, the provenance and lineage engine 110 in the content management system manages the constraints 170 that deal with provenance and lineage. The provenance and lineage engine 110 makes the content data 160 actionable (i.e., actions may be taken as the content data 160 is changed). That is, the provenance and lineage engine 110 takes actions or prevents actions based on the provenance and lineage information 182. For example, the provenance and lineage engine 110:

Prevents an update to the content data 160 if that update will mean the content data 160 has been diluted by 50% of the original value of the content data 160 (e.g., an update is prevented to a document if the update changes 50% of the document relative to the original document). For example, prevents a user from unintentionally or intentionally accessing the content data 160 and changing the content data 160 so drastically that the content data 160 differs completely from an original version.

Determines how many users have contributed to the content data 160.

Ensures and/or proves that only a set of a few users have contributed to the content data 160.

Prevents drastic alterations to the metadata 180 for the content data 160.

The provenance and lineage engine 110 takes as input the provenance and lineage information 182 for the content data 160 and/or the content metadata 184. Based on user supplied constraints 170, the provenance and lineage engine 110 takes actions on the content data 160 and/or the content metadata 184. The provenance and lineage engine 110 may prevent changes to the content data 160 or the content metadata 184 if the changes violate the user defined constraints 170 for provenance and/or lineage. Also, custom user-defined actions may be defined to deal with violations of the constraints.

The provenance and lineage engine 110 allows users to form constraints on the content data 160 and the content metadata 184 with the provenance and lineage information 182 that is maintained by the content management system 100.

Figure 2:
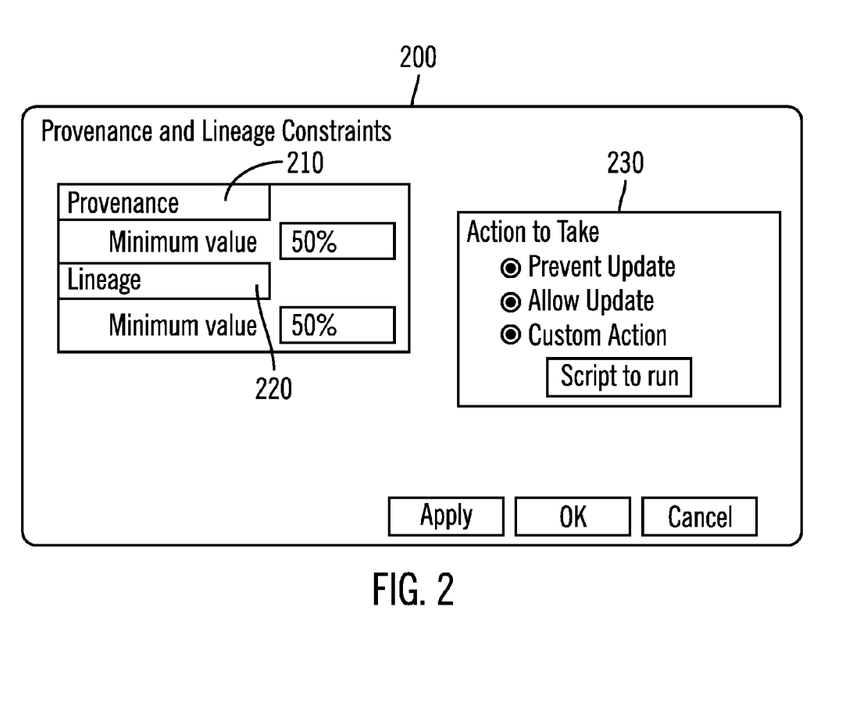
FIG. 2 illustrates, in a block diagram, a user interface for creating provenance and lineage constraints in accordance with certain embodiments

FIG. 2 illustrates, in a block diagram, a user interface 200 for creating provenance and lineage constraints in accordance with certain embodiments. Referring again to FIG. 1, the provenance and lineage engine 110 allows users to set constraints 170 for provenance and/or lineage. The constraints may prevent further modification of content data 160 or content metadata 184 in the event that the modifications would result in the provenance or lineage values dropping below a threshold supplied by the user. In certain embodiments, constraints may be defined based on the provenance or lineage values exceeding a threshold supplied by the user.

In FIG. 2, a user may use element 210 to set a provenance constraint. In this example, the province constraint sets a minimum value to a threshold of 50%. The user may use element 220 to set a lineage constraint. In this example, the lineage constraint sets a minimum value to a threshold of 50%. Also, the user may use element 230 to select an action to take in response to the modifications causing the provenance or lineage to drop below the set thresholds. Referring again to FIG. 1, in certain embodiments, the provenance and lineage engine 110 presents options to the user to describe the actions (e.g., prevent change or allow change) that can be taken when a constraint is violated. Also, the provenance and lineage engine 110 allows a user to select creation of a custom action, and then, the user may supply a separate script or action to take when the constraint is violated. This can be used to cover additional corrective actions or custom notifications that the user wishes to include. For example, if a new user changes data 160, 184, then, the provenance and lineage engine 110 may send a notification to other users of the new author. Also, the custom script or action may indicate that a workflow process is to be executed, and the workflow processor 130 would be initiated to execute the workflow process.

In certain embodiments, the constraints may be for either the content data 160 or for the content metadata 184 (e.g., specific metadata values). For content metadata 184, each provenance and lineage enabled attribute may have associated thresholds for provenance and lineage constraints 170.

The provenance and lineage engine 110 enforces these thresholds for provenance and lineage by employing a check that looks to see whether provenance or lineage constraints are enabled, and, if they are enabled, then the provenance and lineage engine 110 checks values to see if they violate the constraints that the user has configured. If any constraints 170 are violated, the provenance and lineage engine 110 takes the user-defined action associated with the constraint 170.

The provenance and lineage engine 110 is able to calculate for provenance, how much difference there is between versions, and display this information. This type of information may be used in determining whether a constraint 170 has been violated. Also, the provenance and lineage engine 110 may determine the difference between two versions of the content data 160 or the content metadata 184 based on portions of the data 160, 184 changed or based on the data 160, 184 as a whole.

The provenance and lineage engine 110 also can determine whether the most recently changed version of data 160, 184 has such minimal changes that the data 160, 184 is ready for a next process in a workflow (e.g., review or publication).

Figure 3:
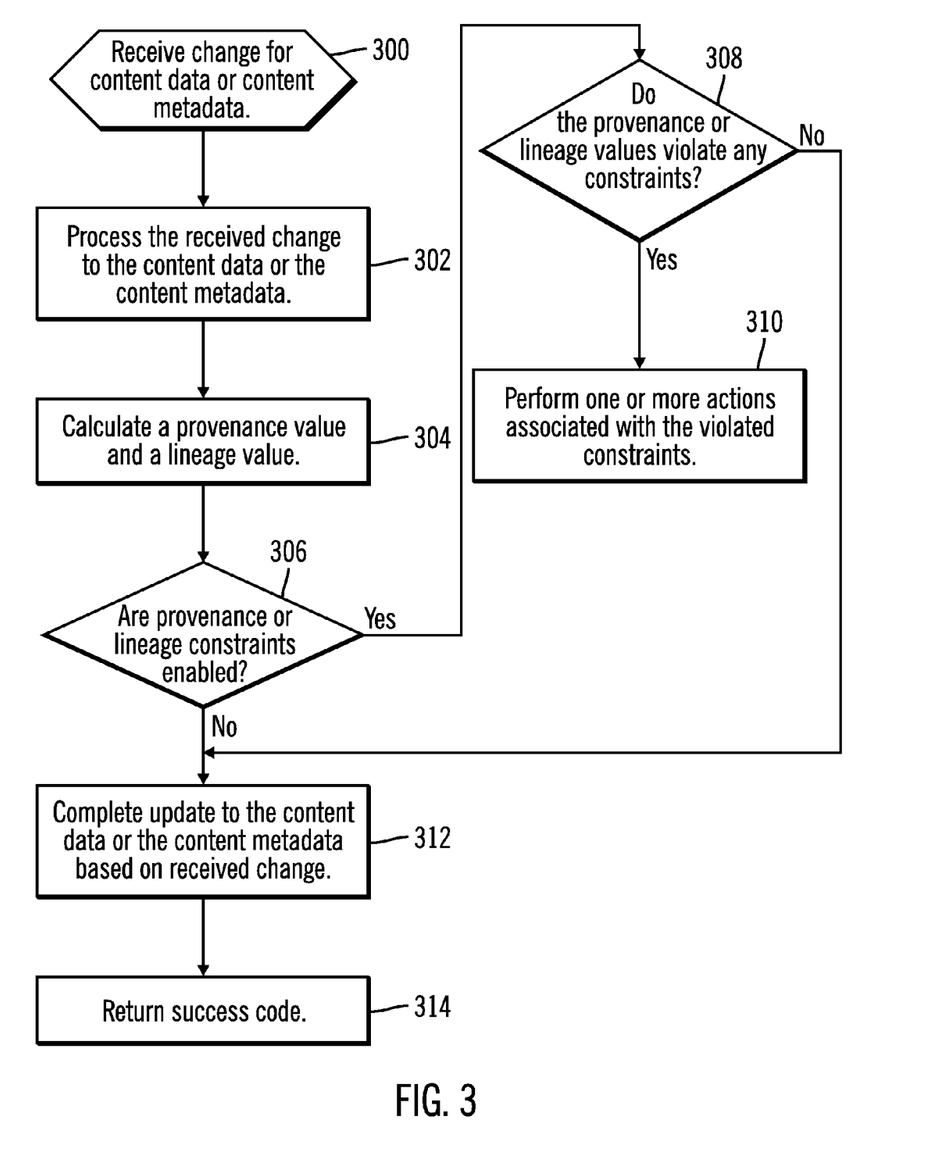
FIG. 3 illustrates, in a flow diagram, logic performed by the provenance and lineage engine to check for constraints in accordance with certain embodiments.

FIG. 3 illustrates, in a flow diagram, logic performed by the provenance and lineage engine to check for constraints in accordance with certain embodiments. With reference to FIGS. 1 and 3, control begins at block 300 with the provenance and lineage engine 110 receiving a change for content data 160 or content metadata 184. In block 302, the provenance and lineage engine 110 processes the received change to the content data or the content metadata. In certain embodiments, processing the received change includes making a temporary change to the content data or the content metadata to enable calculation of new provenance and lineage values. In certain embodiments, processing the received change includes creating a new object representing the newest version of content (i.e., incorporating the latest changes), and, before this new content object is returned to a user or committed in the content management system 100, the provenance and lineage engine 110 performs the provenance and lineate value calculations at block 304 and the subsequent constraint checks.

In block 304, the provenance and lineage engine 110 calculates a provenance value and a lineage value based on the change. In certain embodiments, the content data 160 and metadata 180 (excluding provenance and lineage attributes) are used to calculate provenance and lineage values using differences in changes between one version (or revision) and another (for provenance) and the extent to which different users have authored the content (for lineage). The end result of the provenance and lineage calculations for both content data 160 and metadata 180 is the provenance and lineage information 182. In block 306, the provenance and lineage engine 110 determines whether the provenance or lineage constraints are enabled. If so, processing continues to block 308, otherwise, processing continues to block 312.

In block 308, the provenance and lineage engine 110 determines whether the provenance or lineage values violate any constraints. If so, processing continues to block 310, otherwise, processing continues to block 312. In block 310, the provenance and lineage engine 110 performs one or more actions associated with the violated constraints.

In block 312, the provenance and lineage engine 110 completes the change to the content data 160 or the content metadata 184 based on the received change. In block 314, the provenance and lineage engine 110 returns a success code (e.g., to a calling Application Programming Interface (API)).

In certain embodiments, prior to the processing of block 300, a user checks-out the content data 160 or the content metadata 184. Then, after the change is received in block 300, the provenance and lineage engine 110 determines whether a lineage constraint has been violated, and, if so, performs the action associated with the violated constraint, otherwise, the processing continues to blocks 302-310 of FIG. 3 to process the provenance constraints. In particular, if only one author is allowed, then the changes may be rejected, without having to check the provenance constraints.

The provenance and lineage engine 110 uses the provenance and lineage values (e.g., percentages) to implement a constraint 170 and to inform viewers of the content data 160 of changes that the content data 160 may have undergone since the initial creation of the content data 160.

The provenance and lineage engine 110 applies the provenance and lineage values to implement constraints 170 on the amount of change to the content data 160 or the content metadata 184 that the content management system 100 would permit.

For example, such constraints 170 may be useful if the user (the creator of the content data 160, administrator, etc.) wants to prevent changes to the content data 160 when the provenance drops below 50%. For example, a user may create a test plan where the user has carefully laid out a detailed set of actions and wants the test plan to be more or less preserved. The user could set a provenance constraint of 80%, for example, which might be enough for other people to modify dates in the plan but not much else. As another example, more edits may be allowed, but when a threshold is reached, the edits would trigger a custom script to execute some set of actions to generate a review process of the test plan again.

For lineage, the user may want to limit how many different authors can contribute to the test plan (maybe for discovery or liability purposes) or may want to trigger some re-approval process through a custom action once the lineage drops below a threshold.

With the provenance and lineage engine 110, the constraint system could be used to prevent drastic actions where someone starts destroying content or completely re-writing content in a malicious way (either intentionally or unintentionally).

Figure 4:
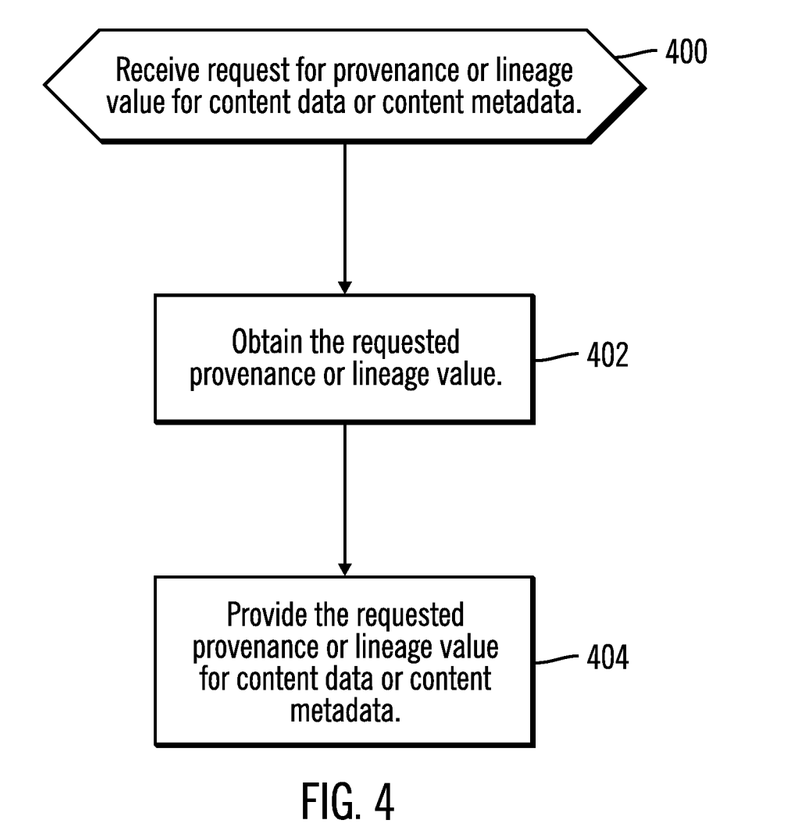
FIG. 4 illustrates, in a flow diagram, performed by the provenance and lineage engine to provide requested provenance and lineage information in accordance with certain embodiments.

FIG. 4 illustrates, in a flow diagram, logic performed by the provenance and lineage engine 110 to provide requested provenance and lineage information in accordance with certain embodiments. Referring again to FIGS. 1 and 4, control begins at block 400 with the provenance and lineage engine 110 receiving a request (e.g., from a user or application) for a provenance or a lineage value for the content data 160 or the content metadata 184. In block 402, the provenance and lineage engine 110 obtains the requested provenance or lineage value. In certain embodiments, the provenance or lineage value is stored (e.g., as part of the provenance and lineage information 182) after being calculated in block 304 of FIG. 3. In certain embodiments, the provenance or lineage value is calculated. In block 404, the provenance and lineage engine 110 provides (e.g., displays) the provenance or lineage value for the content data 160 or the content metadata 184. For example, the provenance value may be displayed as 40% (indicating 40% of the content remains from the original version of content being compared with in the current version of content data 160 as compared to the original version of the content data) or a lineage value of 60% may be displayed (indicating that 60% of original authorship remains, meaning only 60% of change actions (e.g. check-in/check-out) have come from one source in authorship of the current version of content data 160 as compared to the original version of the content data).

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The provenance and lineage engine 110, content manager 120 and/or the workflow processor 130 may be implemented as hardware (e.g., hardware logic or circuitry), software, or a combination of hardware and software.

Figure 5:
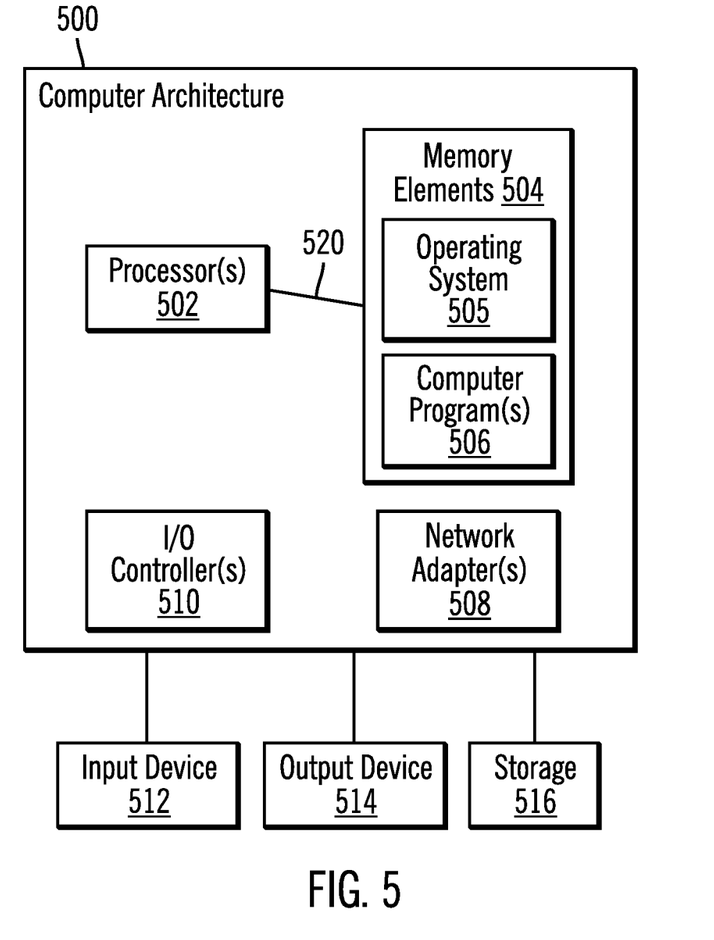
FIG. 5 illustrates, in a block diagram, a computer architecture that may be used in accordance with certain embodiments.

FIG. 5 illustrates a computer architecture 500 that may be used in accordance with certain embodiments. Content management system 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method in a content management system for enforcing constraints, comprising:
   in response to receiving a change to at least one of content data and content metadata associated with the content data:
   calculating, via a processor of a computer, a provenance value based on the change;
   calculating, via the processor of the computer, a lineage value based on authorship of the change, wherein the calculated lineage value represents a number of different authors associated with the change; and
   in response to determining that at least one of the calculated provenance value and the calculated lineage value violates at least one constraint, performing, via the processor of the computer, one or more actions associated with the at least one violated constraint, wherein the one or more actions include one of allowing the change and preventing the change, wherein:
   the at least one constraint is violated based on a predetermined threshold value.

2. The method of claim 1, further comprising:
   in response to determining that the calculated provenance value and the calculated lineage value do not violate the at least one constraint, allowing the change to the at least one of the content data and the content metadata.

3. The method of claim 1, further comprising:
   determining whether the at least one constraint is enabled.

4. The method of claim 1, further comprising:
   displaying at least one of the calculated provenance value and the calculated lineage value.

5. The method of claim 1, wherein the one or more actions include at least one custom user-defined action.

6. The method of claim 1, further comprising:
   storing the calculated provenance value and the calculated lineage value.

7. A content management system for enforcing constraints, comprising:
   a processor; and
   a storage device connected to the processor,
   wherein the storage device has stored thereon a program, and
   wherein the processor is configured to execute instructions of the program to perform operations, wherein the operations comprise:
   in response to receiving a change to at least one of content data and content metadata associated with the content data:
   calculating a provenance value based on the change;
   calculating a lineage value based on authorship of the change, wherein the calculated lineage value represents a number of different authors associated with the change; and
   in response to determining that at least one of the calculated provenance value and the calculated lineage value violates at least one constraint, performing one or more actions associated with the at least one violated constraint, wherein the one or more actions include one of allowing the change and preventing the change, wherein:
   the at least one constraint is violated based on a predetermined threshold value.

8. The content management system of claim 7, wherein the operations further comprise:
   in response to determining that the calculated provenance value and the calculated lineage value do not violate the at least one constraint, allowing the change to the at least one of the content data and the content metadata.

9. The content management system of claim 7, wherein the operations further comprise:
   determining whether the at least one constraint is enabled.

10. The content management system of claim 7, wherein the operations further comprise:
    displaying at least one of the calculated provenance value and the calculated lineage value.

11. The content management system of claim 7, wherein the one or more actions include at least one custom user-defined action.

12. The content management system of claim 7, wherein the operations further comprise:
    storing the calculated provenance value and the calculated lineage value.

13. A computer program product for enforcing constraints, the computer program product comprising:
    a computer readable storage device having computer readable program code embodied therewith, the computer readable program code, when executed by a processor of a computer, being configured to:
    in response to receiving a change to at least one of content data and content metadata associated with the content data:
    calculate a provenance value based on the change;
    calculate a lineage value based on authorship of the change, wherein the calculated lineage value represents a number of different authors associated with the change; and
    in response to determining that at least one of the calculated provenance value and the calculated lineage value violates at least one constraint, perform one or more actions associated with the at least one violated constraint, wherein the one or more actions include one of allowing the change and preventing the change, wherein:
    the at least one constraint is violated based on a predetermined threshold value.

14. The computer program product of claim 13, wherein the computer readable program code, when executed by the processor of the computer, is configured to:
    in response to determining that the calculated provenance value and the calculated lineage value do not violate the at least one constraint, allow the change to the at least one of the content data and the content metadata.

15. The computer program product of claim 13, wherein the computer readable program code, when executed by the processor of the computer, is configured to:
    determine whether the at least one constraint is enabled.

16. The computer program product of claim 13, wherein the computer readable program code, when executed by the processor of the computer, is configured to:
    display at least one of the calculated provenance value and the calculated lineage value.

17. The computer program product of claim 13, wherein the one or more actions include at least one custom user-defined action.

* * * * *